W. CROCKATT.
MACHINE FOR FACING OR REFACING VALVE SEATS AND FOR LIKE PURPOSES.
APPLICATION FILED AUG. 16, 1912.
1,075,198.
Patented Oct. 7, 1913.
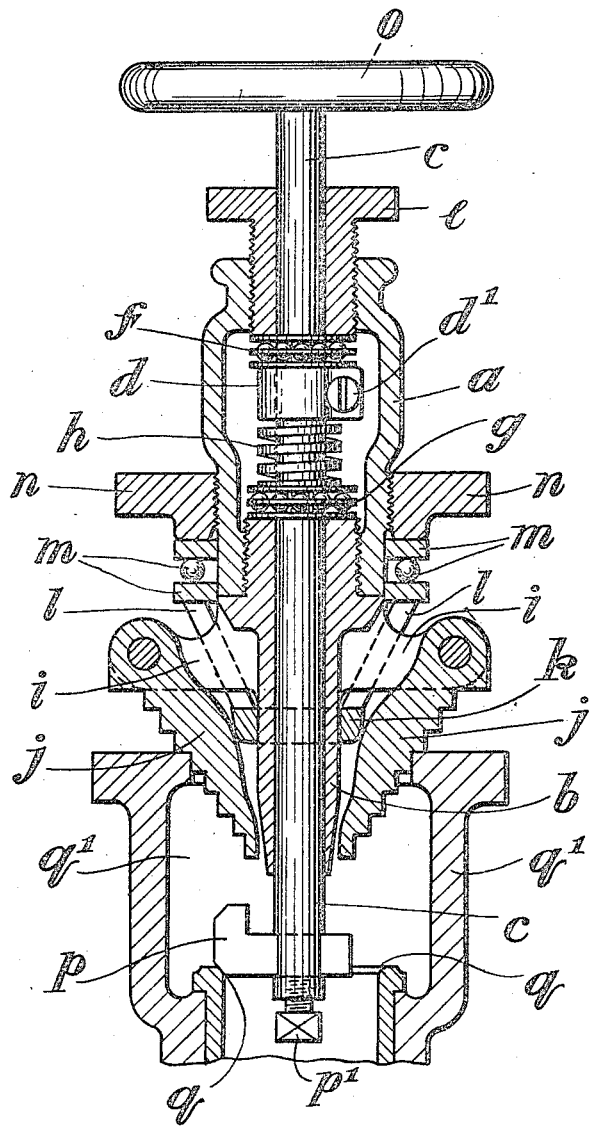
WITNESSES:
INVENTOR
William Crockatt
By Hiedersheim Fairbanks
ATTORNEYS

UNITED STATES PATENT OFFICE.

WILLIAM CROCKATT, OF GLASGOW, SCOTLAND.

MACHINE FOR FACING OR REFACING VALVE-SEATS AND FOR LIKE PURPOSES.

1,075,198.

Specification of Letters Patent.

Patented Oct. 7, 1913.

Application filed August 16, 1912. Serial No. 715,353.

*To all whom it may concern:*

Be it known that I, WILLIAM CROCKATT, a subject of the King of Great Britain, residing at Pollokshields, Glasgow, Scotland, have invented certain new and useful Improvements in Machines for Facing or Refacing Valve-Seats and for like Purposes, of which the following is a specification.

This invention relates to machines for facing or re-facing valve seats its object being to provide improved means whereby the machine can be readily centered and secured in the different sized openings (whether screwed or smooth) of valve casings.

The invention relates more particularly to machines for such purposes, of the type having pivoted arms stepped so as to form segments of an inverted stepped cone and having a coned sleeve member whose outer surface bears against the inner faces of the arms, while the sleeve member on being pressed down expands the stepped arms.

In order that the invention may be clearly understood I have hereunto appended an explanatory drawing which shows, by way of illustration or example, one mode of constructing the machine.

On the drawing the machine is shown in vertical section. The machine shown has an upper body portion $a$ of cylindrical form into the lower end of which a tubular member $b$ is screwed, and passing longitudinally through the parts $a$, $b$, is a central spindle $c$ which fits into the tubular member $b$ and is free to rotate and to move longitudinally therein, while secured on the spindle $c$, within the upper portion $a$, is a clip $d$ having a screw $d^1$ by means of which it may be securely fixed in position on the spindle. Surrounding the upper part of the spindle and screwed into the upper end of the portion $a$ is a feed nut $e$ between the lower end of which and the said clip $d$ a ball-thrust bearing $f$ is provided, and, provided on the upper end of the tubular member $b$, is a second ball thrust bearing $g$, while, between the latter bearing $g$ and the said clip $d$, a helical spring $h$ is held in compression. Extending radially outward from the tubular member $b$ are extensions $i$ (preferably three or four) to each of which there is pivotally secured an arm $j$ having a stepped outer edge or face so that the outer edges or faces together form segments of an inverted stepped cone. Fitted externally on the tubular member $b$ is an externally coned sleeve or ring $k$ adapted to contact with the inner faces of the said arms $j$ and to move vertically and non-rotatably on the member $b$ in such manner as to cause the arms $j$ to turn outward on their pivots, the sleeve or ring $k$ being provided with upwardly extending arms $l$ whose upper ends contact with a ball-thrust bearing or collar $m$ acted on by a nut $n$ screwed on to an external screw thread on the upper portion $a$ in such manner that as the collar or nut $n$ is rotated the sleeve or ring $k$ is pressed downward. The spindle $c$ has a slot or hole for the reception of a cutter $p$ which is secured herein by means of a set pin $p^1$.

On the drawing the cutter $p$ is shown engaging a valve seat $q$ while the stepped outer edges or faces of the arms $j$ engage the opening in the valve casing $q^1$.

In operation, the tool $p$ is first set for the required diameter of seat to be faced, or refaced, and the machine is then placed in position and, on the collar or nut $n$ being rotated, the ring $k$ is forced downward and presses substantially directly against the wall of the opening in the valve casing $q^1$ through the medium of the arms $j$, which latter are pressed directly outward by said ring and accurately center and firmly secure the machine in said opening in the valve casing $q^1$. To operate the tool $p$ the spindle $c$ is rotated by means of the hand wheel $o$ and in order to feed the tool toward its work the feed nut $e$ is simply rotated in such manner as to advance the spindle $c$, the spring $h$ holding up the spindle $c$ and preventing the tool dropping into any depressions in the valve seat. The steps on the arms insure that some one of the diameters of the steps will approximately fit the bore of the casing of the valve to be operated upon.

Having now fully described my invention what I claim and desire to secure by Letters Patent is:—

1. In a device of the character stated, the combination of a rotatable spindle adapted to carry a tool, a sleeve member on the spindle, stepped arms pivoted on said sleeve member, a forcing member located between the stepped arms and said sleeve member and below the pivotal points of said stepped arms, actuating means on said sleeve member located above the pivotal point of the stepped arms, and connections between said actuating means and said forcing means, adapted to depress said forcing means and directly force the stepped arms outwardly.

2. A machine of the character described having, in combination, a rotatable spindle with a cutter thereon, a sleeve member on the spindle, arms projecting laterally from the member, stepped arms loosely pivoted from said projecting arms, a collar slidably mounted on said sleeve member, a ring member located between the stepped arms and said sleeve member, arms on said ring member contacting with said slidable collar above the pivotal connection of said stepped arms and means on said sleeve member adapted to depress said ring member without turning the same and directly force the stepped arms outward.

In testimony whereof I affix my signature in presence of two witnesses.

WILLIAM CROCKATT.

Witnesses:
   WILLIAM FLEMING,
   WILLIAM CARRUTHERS.